United States Patent [19]

Widmer

[11] 4,292,905
[45] Oct. 6, 1981

[54] DATA DISPLAY DEVICE FOR SEWING MACHINE ADJUSTMENT AND SET-UP

[75] Inventor: Hans Widmer, Magglingen, Switzerland

[73] Assignee: Fritz Gegauf AG, Bernina-Naehmaschinenfabrik Steckborn, Steckborn, Switzerland

[21] Appl. No.: 126,158

[22] Filed: Feb. 29, 1980

[30] Foreign Application Priority Data

Mar. 15, 1979 [CH] Switzerland ......................... 2442/79
May 2, 1979 [CH] Switzerland ......................... 4084/79

[51] Int. Cl.³ ............................................ D05B 19/00
[52] U.S. Cl. ............................... 112/121.11; 364/709; 364/710
[58] Field of Search ...................... 112/121.11, 121.12, 112/158 E, 158 F; 364/706, 709, 710, 715, 716; 273/85 G

[56] References Cited

U.S. PATENT DOCUMENTS

| | | | |
|---|---|---|---|
| 3,613,610 | 10/1971 | Hinerfeld et al. | 112/262.3 |
| 3,871,310 | 3/1975 | Hanyu | 112/158 F |
| 4,079,683 | 3/1978 | Hanyu et al. | 112/158 F |
| 4,092,523 | 5/1978 | Tava et al. | 364/710 X |
| 4,100,865 | 7/1978 | Landau, Jr. et al. | 112/121.11 |
| 4,166,423 | 9/1979 | Brienza et al. | 112/158 E |

*Primary Examiner*—Peter P. Nerbun
*Attorney, Agent, or Firm*—Wender, Murase & White

[57] ABSTRACT

The device discussed herein which is preferably a separate auxiliary unit, is equipped with a keyboard for entry of sewing conditions such as material type and sewing operation. Data is entered in an electronic memory which contains instructions for sewing machine adjustment and set-up. These instructions are clearly indicated at certain points on the device or preferably on the sewing machine for the most part so that sewing machine adjustment and set-up can be performed without special previous knowledge. In this connection, it is possible to supply clear instructions for a great number of data combinations directly at the points of the sewing machine where adjustment and set-up occur.

15 Claims, 4 Drawing Figures

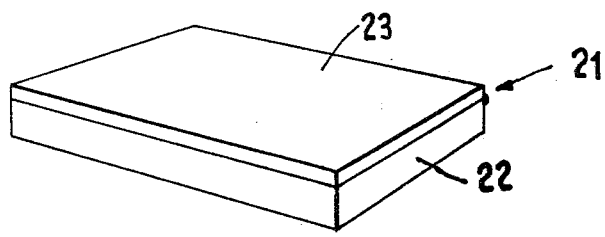
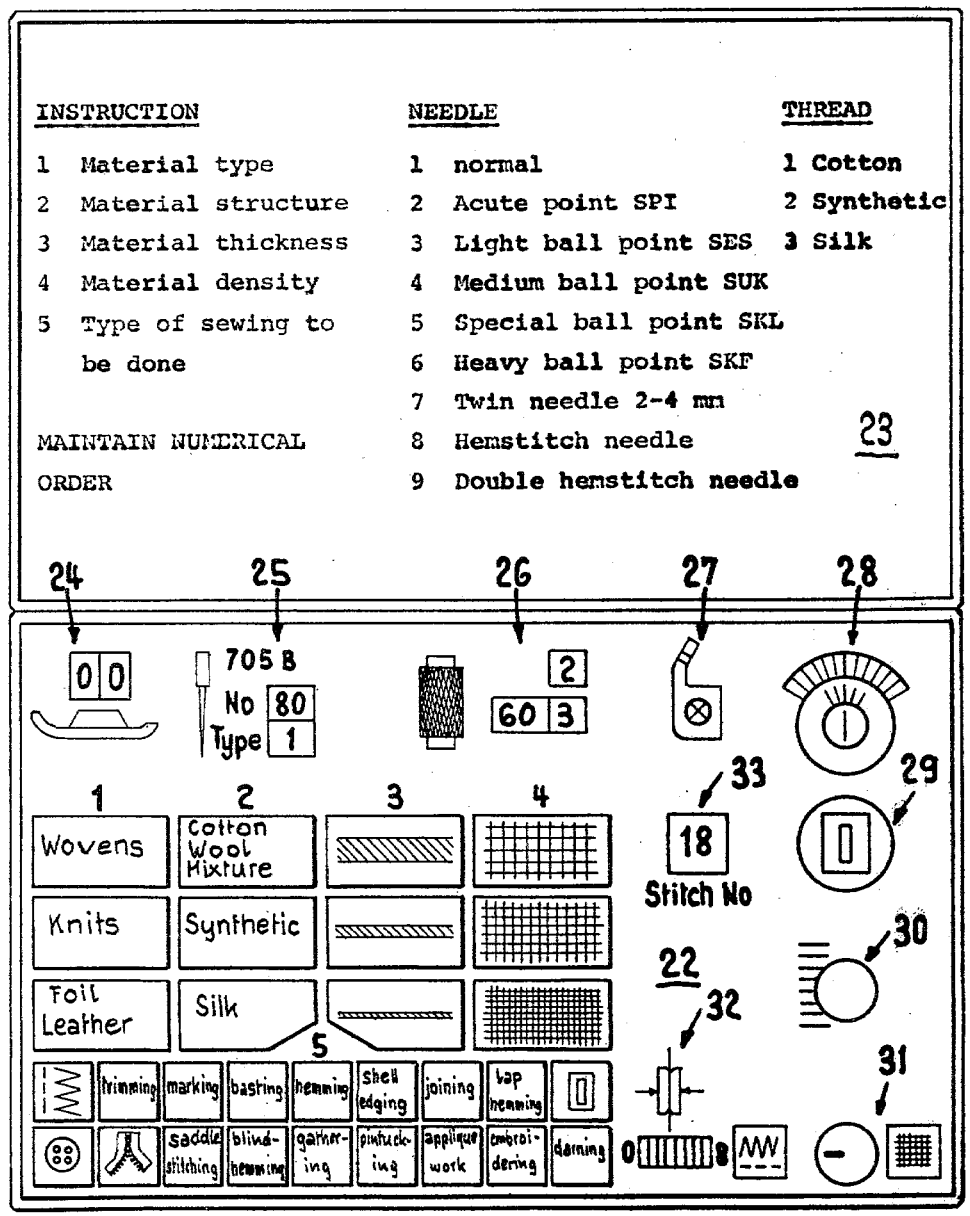

DATA DISPLAY DEVICE FOR SEWING MACHINE ADJUSTMENT AND SET-UP

BACKGROUND OF THE INVENTION

The invention described herein relates to a display device for data required for the adjustment and set-up of a sewing machine with known drive and control systems in conjunction with the machine parts involved in the sewing operation and manually operated adjustment devices assigned to these control systems. The adjustment possibilities of modern sewing machines with regard to the sewing opertion and the material to be sewn are so extensive that for a minimum number of typical sewing operations and materials, the operator must be provided with data on machine adjustment and the use of certain accessories for a certain thread. It is standard practice to provide such data in a chart on the inside of a hinged cover of a sewing machine housing (U.S. Pat. No. 4,079,683) or to provide a folded chart under the cover (U.S. Pat. No. 3,871,310). Such charts, however, have substantial disadvantages. The number of combinations of sewing operation prerequisites for adjustment and set-up instructions which can be contained in the chart is limited in every case. The larger the chart and combination of predefinable conditions and readable information, the more unsurveyable the chart and easier it is for errors to occur. During machine set-up, it is also not highly practical if machine alterations must be performed, e.g. the opening of a cover.

SUMMARY OF THE INVENTION

The purpose of this invention is to create a device which avoids the above-mentioned disadvantage of existing concepts, handles a much broader scope of data, precludes the possibility of reading errors as well as the necessity for the machine alterations.

The invention attains this object in that it has an input unit for different variable data such as material type, sewing operations to be performed, etc. and memories which are accessed and programmed by the input unit. These memories handle storage of optimum adjustment values of ranges, which are necessary for performing different sewing operations on different materials, and which are required for the sewing machine as well as operation-related accessories such as the foot, needle, thread, etc. Individual data or conditions for the sewing operations can be entered consecutively and individually after which instructions for the adjustment and set-up are clearly displayed, thus precluding the possibility of errors and thereby ensuring optimum machine adjustment and set-up even by personnel with limited experience in sewing machine operation.

BRIEF DESCRIPTION OF THE DRAWING

A more detailed description of the invention will now be given on the basis of the two model types depicted in the illustration.

FIG. 1 shows a perspective view of the first device.

FIG. 2 shows a top view in larger scale of the opened device in the operation status.

DESCRIPTION OF FIRST EMBODIMENT

Figure 3:
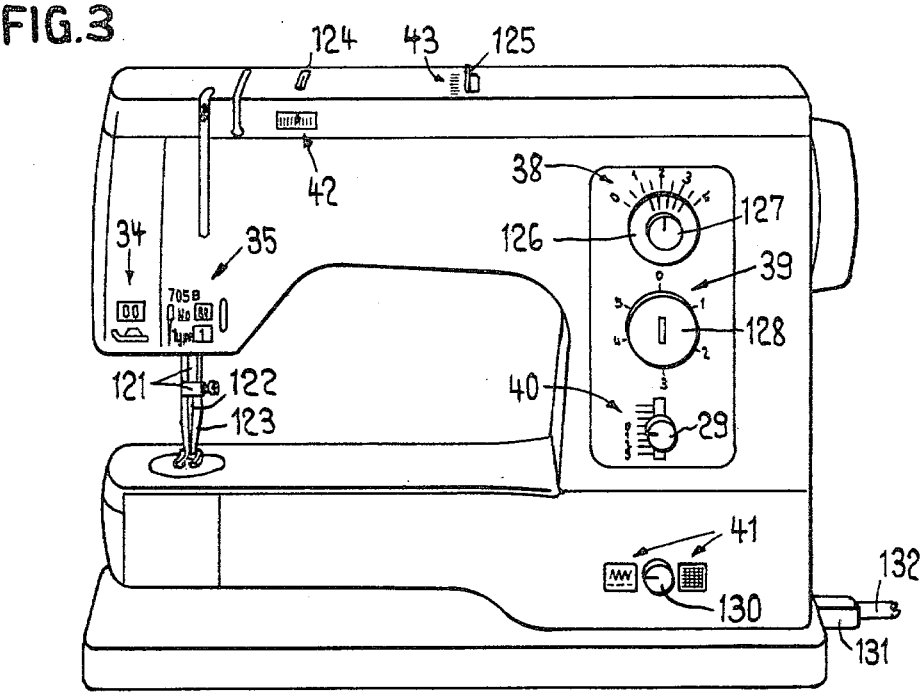
FIG. 3 shows a perspective view of a sewing machine according to the second model type.

The device shown in FIGS. 1 and 2 comprises flat case 21, base 22, cover 23 and is similar in size and design to a pocket calculator. When the cover is closed as shown in FIG. 1, the electronic system is automatically switched off and can be automatically switched on when the cover is opened.

When cover 12 is open as shown in FIG. 2, instructions or specific data appear on the inside of the cover and a keyboard subdivided into sections 1–5 is provided on base 22. Different displays with symbol identifications are provided on the panel of base 22. As shown in FIG. 2, the three section 1 pushbuttons handle data input for material type, i.e. wovens, knits, foil or leather. Section 2 pushbuttons permit additional data input regarding the material, i.e. cotton, wool or mixtures, synthetic fabric or silk. Section 3 pushbuttons permit data intput regarding material thickness, i.e. thin, medium or thick material. Section 4 pushbuttons handle data input regarding the material density of wovens or knits. Section 5 pushbuttons handle entry of the most diverse sewing operations and have either symbol or word designations. The LED or liquid crystal displays comprise display 24 which is identified by a foot symbol. The 2-digit display indicates the foot number which is also designated on the foot by a suitable means. Display 25 is the needle display and is also identified by a symbol. A 2-field display indicates needle thickness and type. Display 26 indicates the thread to be used and also identified by a symbol. A 3-field display provides data on the thickness and type of thread to be used. Display 27 is activated when the supplementary thread guide on the bobbin case finger indicated by a symbol must be used for certain sewing operations, e.g. buttonhole sewing. Display 28 which shows the corresponding means of adjustment and scales of the sewing machine has a number of display fields which can be activated individually to adjust stitch width and needle deflection. The operator must only set the corresponding elements on the sewing machine into the displayed position. Display 29 provides references for the buttonhole sewing. Display 30 which, in turn, has a scale of individually operating fields indicates the stitch length, whereby the scale position of the adjustment element must correspond with the position on the scale of display 30. Display 31 indicates the position in which a correspondingly designed sewing machine adjustment element must be set for material feed to be operative or inoperative; one position is for darning/freehand embroidery and the other is for sewing. Display 32 indicates thread tension, and the value to be adjusted between 0 and 8 is indicated by an illuminated field of the scale. Display 33 indicates the stitch pattern number to be set.

To perform sewing machine adjustment, the operator enters all data by means of pushbuttons 1–5, i.e. material structure, material thickness and sewing operation to be performed. When this procedure is completed, i.e. after the corresponding pushbuttons of section 1–5 have been actuated, the display for sewing machine adjustment and set-up automatically appears. The individual displays have already been discussed. If necessary, the operator interchanges accessories and thread and then performs the required adjustments according to displays 28–33.

It is obviously apparent that this auxiliary unit permits a highly diverse selection of conditions and displays of instructions under the preclusion of errors.

Figure 4:
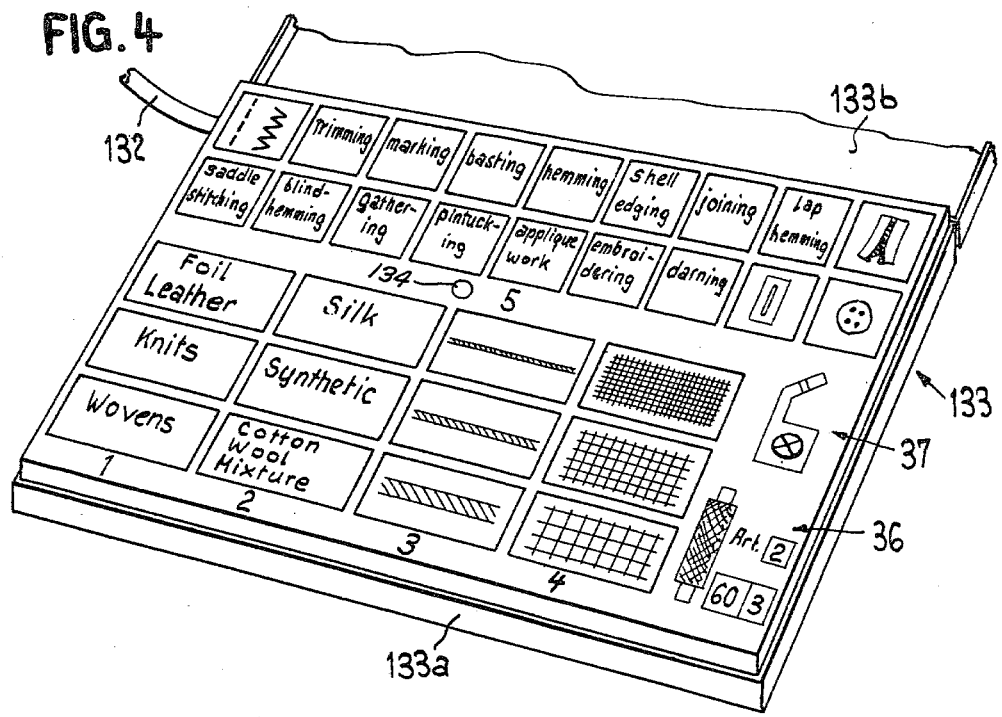
FIG. 4 shows a top view of a device in operation with the sewing machine.

To ensure that sewing machine adjustment and set-up can be made even simpler and more reliable, at least some of the displays can be located on the sewing machine next to adjustment elements and set-up points. Individual data or conditions for the sewing operation can in this case be entered consecutively and individually after which some or all of the adjustment and set-up instructions are displayed on the machine itself making machine adjustment and set-up operations particularly convenient and reliable. FIGS. 3 and 4 show a model of this type in which corresponding parts have identical designations as those in FIGS. 1 and 2.

DESCRIPTION OF SECOND EMBODIMENT

The sewing machine shown in FIG. 3 has standard adjustment and set-up elements, i.e. needle bar 121 which accepts needle 122, presser foot bar 123 on which different interchangeable presser feet can be mounted, adjustment thumbwheel 124 for thread tension, selector lever 125 for different ornamental stitches, rotary adjustment knob 126 for stitch width, rotary adjustment knob 127 for needle deflection, control knob 128 for buttonhole sewing, slidable adjustment knob 129 for stitch length selection and selector knob 130 with positions for sewing or darning/freehand embroidery. As shown in FIG. 4, the sewing machine is connected to device 133 by means of a multi-contact connector 131 and flexible power cord 132. Device 133 corresponds largely to that shown in FIGS. 1 and 2.

This device is designed as a flat case 133 with base 133a and cover 133b.

When the cover is open according to FIG. 2, instructions or specific data are provided on the inside of the cover and keyboard subdivided into sections 1–5 corresponds to those sections in FIG. 2 and is accessible on base 133a. Different displays identified by symbols are provided on the base panel.

The LED or liquid crystal displays comprise display 34 on the machine housing above the foot. This 2-digit display is designated by a foot symbol and indicates the number which is provided on the foot by suitable means. Display 35 situated above the needle rod is the needle display and is also identified by a symbol. A 2-field display indicates needle thickness and type. Display 36 situated in 133 indicates the thread to be used and is also identified by a symbol. A 3-field display 36 provides data on the thickness and type of thread to be used. Display 37 is activated when the supplementary thread guide on the bobbin case finger indicated by a symbol must be used for certain sewing operations, e.g. buttonhole sewing. Display 38 designed as scales for the corresponding adjustment knobs 126 and 127 has a number of display fields which can be individually activated to indicate stitch width needle deflection. The operator must only set the corresponding knobs 126 and 127 of the sewing machine into the indicated position. Display 39 provides references for buttonhole sewing. Display 40 which, in turn, has a scale of individually operative fields indicates the stitch length, whereby the scale position of adjustment element 129 must correspond with the position on the scale of display 40. Display 41 indicates the position in which adjustment element 130 must be set for material feed to be operative or inoperative; one position is for darning/freehand embroidery and the other is for sewing. Display 42 indicates thread tension, and the value to be adjusted between 0 and 8 is indicated by an illuminated field of the scale. Thread tension can be adjusted by thumbwheel 124 immediately adjacent to the display. Display 43 indicates the stitching pattern number to be set and permits direct setting of the adjacent selector lever 125.

Adjustment and set-up of the sewing machine are performed according the above-mentioned procedure and on the basis of FIGS. 1 and 2.

It is possible to connect device 133 to the sewing machine permanently or by means of a plug connection. It would also be possible to mount the device directly on the machine by providing a free space for the keyboard.

Displays 36 and 37 can also be provided at suitable locations on the machine near the reel holder and the bobbin case.

A different input system, e.g. one which employs sensors, a telephone dial or similar device can be used in place of the keyboard. Variable data can be recorded on a digit conversation table and input in this case occurs in a digital sequence, i.e. with the above-mentioned dial. The digit code can be provided on the device, e.g. on the inside of cover 133b. The device can also be used as a coiling unit for the flexible cable. An acknowledgement system with optical signalling device such as indicator display 134 could also be provided which checks and indicates whether or not the sewing machine is properly adjusted to perform the entered sewing operation, i.e. whether the displays indicate that all adjustments have been performed.

It may be advantageous to provide sequential data input and/or a sequential display for adjustment values or ranges as well as for the accessories required for the operation. A sequential data input would be possible with a substantially simplified, clearly arranged keyboard so that the device could be of relatively compact design.

The sequential data display for sewing machine adjustment and set-up substantially facilitates the provision of sewing machine readiness and precludes the possibility of omitting or neglecting adjustments.

The consecutive appearance of displays on the adjustment elements and set-up points compels the operator to perform machine adjustment and set-up in a step-by-step manner according to a programmed sequence and to acknowledge each adjustment and/or set-up operation by means of a separate pushbutton after which the next display appears. As has already been mentioned, an optical acknowledgement system could be used to indicate machine readiness after all adjustment and set-up operations are performed.

In the case of the model types discussed, only data or instructions for sewing machine adjustment and set-up are provided. However, it is possible by means of the mounted device to supply additional data for machine operation during the sewing operation. Such instructions can be provided primarily when sewing on buttons, sewing buttonholes, etc. To provide such instructions, a display can be provided with segments or points on which parts of the instruction text can occur preferably in the form of a moving message display. Such displays for indicating instructions texts can be provided for all information including adjustment and set-up. On the other hand, any instruction could be acoustically supplied by means of recorded tape.

What I claim is:

1. A device for selecting and displaying optimum conditions for set-up of sewing machine controls and elements, comprising:

an input unit having a plurality of means for manually producing data fully characterizing a material type and any type of sewing operation desired to be performed;

a memory accessed by said data produced by said input unit and in which is stored all optimum sewing machine adjustment values including ranges for performing any selected sewing operation on different materials in addition to accessory data characterizing foot, needle and thread settings; and means connected to said memory for displaying said optimum sewing machine adjustment values and said accessory data corresponding to said manually produced data, whereby the sewing machine can be fully set-up for optimum operation.

2. Device according to claim 1, characterizing in that it is designed as a mobile tabletop unit similar in design to a pocket calculator.

3. Device according to claim 1, which is incorporated in the sewing machine.

4. Device according to claim 3, which is integrated in an accessory compartment of the sewing machine.

5. Device according to claim 1, wherein said means for displaying comprises a digital display of said adjustment values and said accessory data.

6. Device according to claim 1, wherein said means for displaying comprises an analog display of said adjustment values and a digital display of said accessory data.

7. Device according to claim 1, characterized in that said means for displaying said adjustment values are arranged on the device corresponding to the layout of the controls and elements on the sewing machine.

8. Device according to claim 3, wherein at least a part of said means for displaying is grouped on the sewing machine and associated to the controls and elements.

9. Device according to claim 8, wherein optical displays have scales consisting of individually operable display fields which are arranged for the assigned adjustment elements of the sewing machine in such a manner that adjustment can be performed on the activated scale.

10. Device according to claim 8 or 9, wherein the device is connected to the sewing machine by means of power cord or plug-connected by means of multi-contact connector.

11. Device according to claim 8, comprising an acknowledgement system with an optical signaling unit which indicates whether or not the sewing machine is ready to perform the entered sewing operation.

12. Device according to claim 1, which is mounted on the sewing machine.

13. Device according to claim 1, wherein said means for displaying comprises an alphanumeric display for said adjustment values and said accessory data.

14. Device according to claim 1, wherein said means for displaying comprises an analog display for said adjustment values and an alphanumeric display for said accessory data.

15. A method for selecting and displaying optimum conditions for set-up of sewing machine controls and elements, comprising the steps of:

storing in memory all optimum sewing machine adjustment values including ranges for performing any selected sewing operation on different materials in addition to accessory data characterizing foot, needle and thread settings;

manually operating an input unit to produce data fully characterizing a material type and any type of sewing operation desired to be performed;

accessing said memory with said data to output optimum sewing machine adjustment values and said accessory data corresponding to said data; and displaying said optimum sewing machine adjustment values and said accessory data, whereby the sewing machine can be fully set-up for optimum operation.

* * * * *